(12) United States Patent
Vallet et al.

(10) Patent No.: US 7,474,716 B2
(45) Date of Patent: Jan. 6, 2009

(54) DATA RECOVERY CIRCUITS USING OVERSAMPLING FOR MAVERICK EDGE DETECTION/SUPPRESSION

(75) Inventors: Vincent Vallet, Mennecy (FR); Didier Malcavet, Champceuil (FR)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 11/160,755

(22) Filed: Jul. 7, 2005

(65) Prior Publication Data
US 2006/0008040 A1    Jan. 12, 2006

(30) Foreign Application Priority Data
Jul. 8, 2004    (EP) .................................. 04300431

(51) Int. Cl.
*H03D 1/00* (2006.01)

(52) U.S. Cl. ...................... 375/340; 375/354; 375/375; 375/371; 375/373; 375/376; 375/316; 375/219; 341/143; 455/403

(58) Field of Classification Search ................ 375/340, 375/354, 375, 376, 371, 373, 319, 348, 219; 341/143; 455/403
See application file for complete search history.

(56) References Cited

U.S. PATENT DOCUMENTS 6,650,661 B1 * 11/2003 Buchanan et al. ........... 370/516
2004/0202266 A1 * 10/2004 Gregorius et al. ........... 375/355

\* cited by examiner

*Primary Examiner*—David C. Payne
*Assistant Examiner*—Zewdu Kassa
(74) *Attorney, Agent, or Firm*—James J. Cioffi; Rosa Suazo Yaghmour

(57) ABSTRACT

A data recovery circuit employing an oversampling technique. The incoming serial data stream with jitter is oversampled by means of the multiple phases of a reference clock to produce data samples. Each sample is compared to the samples collected with the next clock phase in an edge detector circuit to determine the presence of a data edge. The edge information, representative of the data edge positions, is stored and accumulated in the form of a bit map. A detection/suppression circuit detects and suppresses edges which are not adjacent to any other edge in the edge memory. A selection determination circuit uses the edge information to indicate which sample is the farthest from the data edges. A selection validation circuit validates the selection to avoid false determination due to jitter and skew.

20 Claims, 9 Drawing Sheets

DATA RECOVERY CIRCUITS USING OVERSAMPLING FOR MAVERICK EDGE DETECTION/SUPPRESSION

FIELD OF THE INVENTION

The present invention relates to high speed serial communications/data transfers between integrated circuits or systems and more particularly to improvements to data recovery circuits based on an oversampling technique for maverick edge detection and suppression.

BACKGROUND OF THE INVENTION

In the field of high speed serial communications/data transfers between integrated circuits or systems, data recovery circuits are extensively used in transceivers. The performance of a data recovery circuit is intimately tied to its capacity to correctly recover the transmitted data when the clock period varies with time. It must also be able to deal with any type of troubles introduced by transmission channel artifacts as well as by modulation and pulse shaping components in the transmission paths. Therefore, to sustain high data rate, the data recovery circuit must be able to deal with these data perturbations usually referred to respectively as the jitter and intersymbol interference (ISI).

Consider a conventional data recovery circuit using the oversampling technique. Schematically, it first comprises an oversampling circuit that generates a plurality of data samples during each data period, an edge detection circuit, a selection determination circuit, a selection validation circuit and a selection memory that are connected in series. The role of these circuits is to determine which one of the data samples is the best to keep. It further comprises a data sample selection circuit. The memorized validated selection signals obtained at the output of the selection memory and the data samples are applied to this data sample selection circuit to generate the recovered data. The effect of the jitter is to decrease the width of the time interval in which the data signal can be reliably sampled. The effect of the ISI is to add a delay on the data stream depending on the past values of the data.

FIG. 1 is an example of a typical eye diagram for a high speed serial data link. Data jitter (and phase error between the reference clock and data as well) can significantly reduce the sampling window (hatched area) which thus becomes shorter than the bit period T. As apparent in FIG. 1, the edge positions (broken lines) can significantly move due to jitter (and ISI), in fact much more than illustrated, up to about 30% of the bit period in some cases. For data recovery circuits using the oversampling technique, the sampling window is determined from the edges or transitions of the data bit, so that accurately detecting edge positions is essential. It is also important to determine whether a particular detected data edge is representative or if it should be removed from the statistical processing of the data edges because it sits away from the group. A Data Edge Memory is then needed to memorize over an extended period of time the data edges so that they can be considered as a statistical result representative of the data eye diagram.

Consider the following examples of set of data edges from the Data Edge Memory: 00000000, 00010000, 00111000 and 01110100. There is no edge detected in the first example and one edge in the second example. In reality, due to the above mentioned perturbations, such a perfect detection never occurs. Example 3 is more realistic and the edge is detected at three consecutive positions. The problem raised by the maverick data edge is illustrated by example 4. Presence of a '0' between two '1's reveals an anomaly, typical of a maverick data edge related problem that should be understood and addressed. In addition to jitter and ISI, some sporadic perturbations can occur to add a delay on the data stream.

Among these sporadic perturbations, the detection of a data edge at an abnormal position with respect to other data edges is one of the most important, because it can lead to sample the data at non-optimum positions. This particular type of perturbations is referred to as a maverick data edge in the technical literature. Some attempts have been made in the prior art to statistically determine the normal edge positions and to dismiss any maverick data edge, the position of which would be spaced thereof. To detect such a notable shift from normality has been done using a battery of counters (one per sampling phase). As result, this solution is complex and expensive because it consumes a lot of silicon area when the data recovery circuit is integrated in silicon. For high speed data transfers, these sporadic delay perturbations can substantially decrease the capacity of the data recovery circuit to tolerate the normal cycle-to-cycle random data jitter. Therefore, it would be highly desirable to detect and then dismiss these maverick data edges.

SUMMARY OF THE INVENTION

It is therefore an object of the present invention to provide improvements to data recovery circuits using oversampling for maverick data edge detection and suppression.

It is another object of the present invention to provide improvements to data recovery circuits using oversampling for maverick edge detection and suppression that allow full and simple digital circuit integration.

According to the present invention there is described an improved data recovery circuit based on an oversampling technique wherein data edges are analyzed to detect and then suppress maverick data edges before being used for locating the best sample to keep. The improvement consists of inserting a dedicated circuit between the data edge memory and the selection determination circuit of the conventional data recovery circuit. The memorized data edge positions as determined by the edge detection circuit are analyzed to determine if a given detected data edge position is adjacent to other detected edge positions or not. If not, it is a maverick data edge position corresponding to an event that is unlikely to repeat itself during a predetermined number of bit periods. The detection circuit then generates a validation signal which indicates if the considered data edge is valid for the determination of the best position for sampling the data to keep.

The novel features believed to be characteristic of the invention are set forth in the appended claims. The invention itself, however, as well as other objects and advantages thereof, may be best understood by reference to the following detailed description of an illustrated preferred embodiment to be read in conjunction with the accompanying drawings.

DETAILED DESCRIPTION OF THE PREFERRED EMBODIMENT

The present invention relates to an improved data recovery circuit based on an oversampling technique for maverick data edge detection/suppression. The disclosed circuit operates independently of the number of data links so that the data recovery mechanism of the present invention will be only described herein below for one data link.

Figure 2:
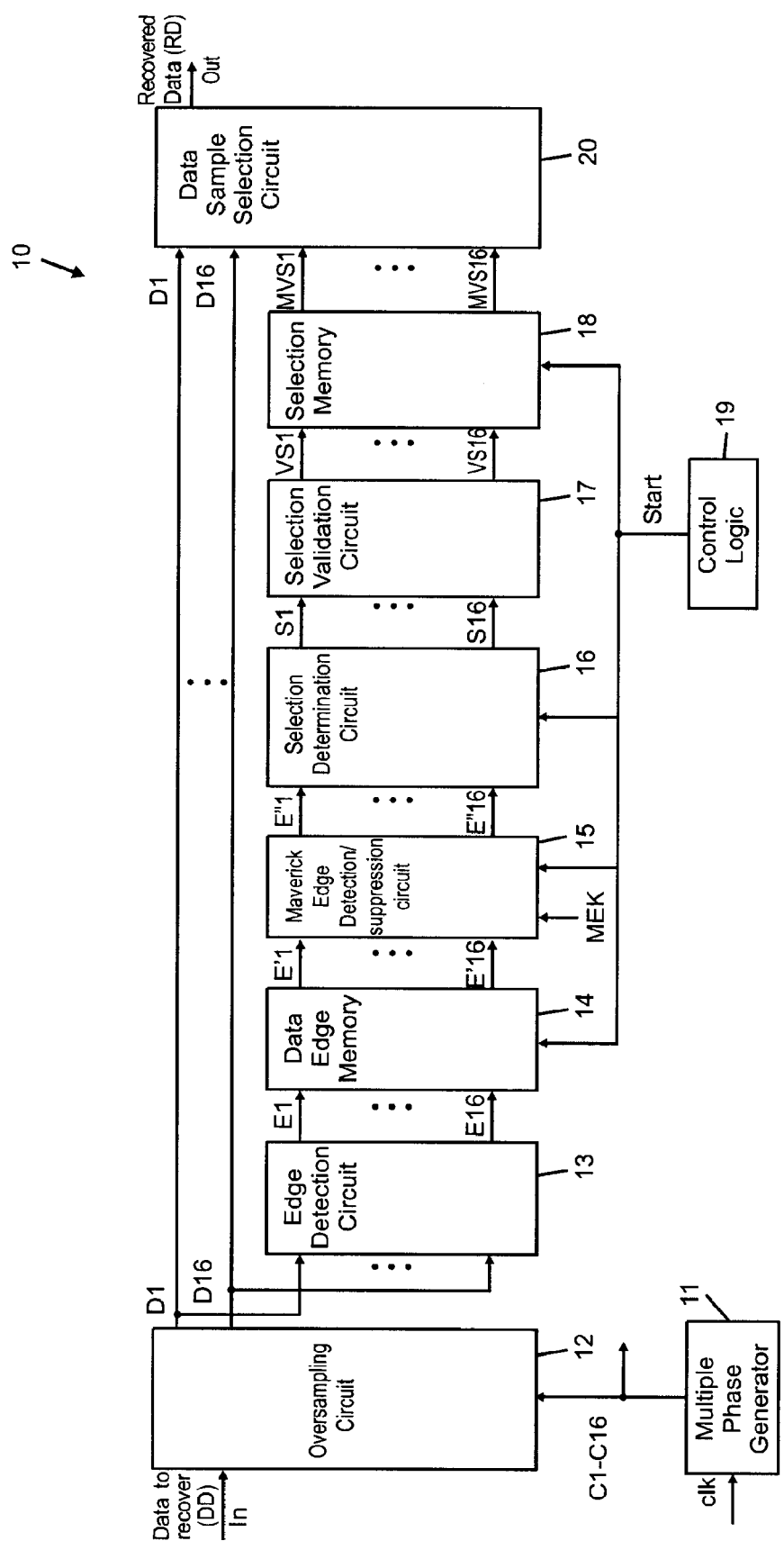
FIG. 2 shows the improved data recovery circuit wherein the maverick data edge detection/suppression circuit has been implemented according to the present invention.

Referring to FIG. 2, the improved data recovery circuit 10 includes a multiple phase generator 11 driven by a reference clock synchronized with the data link. The multiphase clock generator 11 is required to generate an adequate number n of clock phases, e.g., 16 in the present implementation, referenced $C_1$ to $C_{16}$, that are derived from a reference clock labeled clk. The multiple phases are applied to an oversampling circuit 12 (and to other circuits whenever necessary) that receives the stream of serial data to recover (DD) at the In terminal to generate data samples, referenced $D_1$ to $D_{16}$.

It further includes an edge detection circuit 13, a data edge memory 14, a maverick data edge detection/suppression circuit 15, a selection determination circuit 16, a selection validation circuit 17, and a selection memory 18 that are connected in series. Control logic circuit 19 plays the role of a state machine. It generates one (or more) control signal labeled Start that is applied to some circuit blocks. Another control signal referenced MEK is specifically applied to the maverick data edge detection/suppression circuit 15. Finally, the data samples $D_1$ to $D_{16}$ and the signals $MVS_1$ to $MVS_{16}$ output by the selection memory 18 are applied to data selection circuit 20.

The incoming stream of serial data is continuously oversampled in oversampling circuit 12 by means of the multiple phases of the reference clock. Each data sample is compared in edge detector circuit 13 to the data sample collected with the next adjacent clock phase to determine the presence of a data edge or transition and the edge information, i.e., the edge positions, is collected in data edge memory 14 for a duration that can be tuned. This data edge memory 14 can be cleared at regular time intervals.

According to the present invention, the data edge information stored in the data edge memory 14 is filtered (detection/suppression) in an innovative circuit, referred to as the Maverick data edge detection/suppression circuit, which has the role of detecting and suppressing maverick data edges, i.e., edges which are not adjacent to any other edge in the edge memory. During this detection the first position of the data edge memory is considered to be adjacent to the last position of the edge memory. Suppression, tuning and clearing are performed by control logic circuit 18. The selection determination circuit 16 uses the memorized edge information to indicate which data sample is the farthest from the data edges.

Selection validation circuit 17 has the role of validating the selection to avoid false determination due to jitter and skew. The validated values of the selection signals are memorized in selection memory 18, so that these values can be used while new data edges are processed and new selection signals are updated. Finally, the memorized validated selection signals $MVS_1$ to $MVS_{16}$ and the data samples $D_1$ to $D_{16}$ are exploited in data selection circuit 20 to recover the data. The combination of circuits 13 to 18 is thus based on the detection of data edges or transitions in the set of data samples to drive the data sample selection circuit 20 in order to select the best sample to be kept, i.e., the recovered data RD. As shown in FIG. 2, the recovered data RD is available at the Out terminal.

1. Description of the Multiphase Clock Generator 11

A preferred embodiment of the present invention uses a phase locked loop oscillator (PLL) to generate n=16 multiple phases of a reference clock. The clock frequency can be the same as the data frequency, i.e., one data bit per clock period or half of the data frequency, i.e., two data bits per clock period, also referred to as single data rate (SDR) or double data rate (DDR) respectively. The reference clock may be synchronously transmitted by the distant apparatus or may be recovered from the data stream using standard clock recovery circuits.

Figure 3:
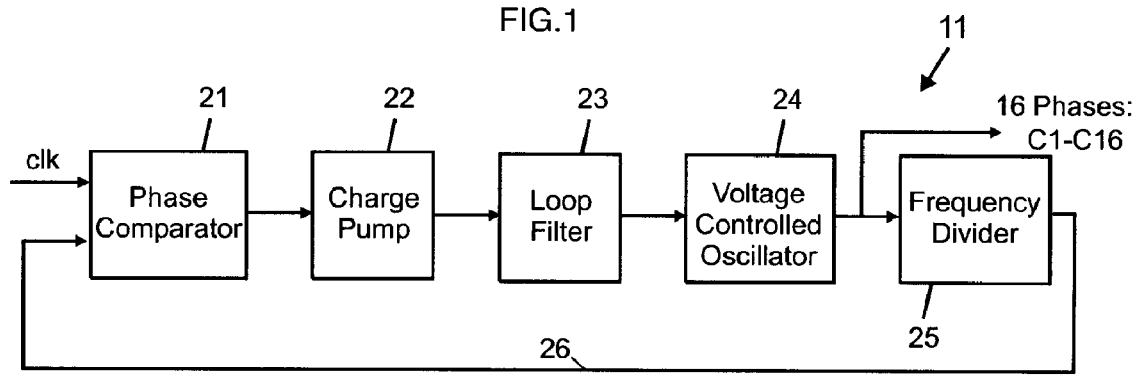
FIG. 3 is the circuit diagram of the multiphase clock generator of FIG. 2 using a standard phase locked loop (PLL) circuit designed to generate N=16 phases.

A conventional PLL based multiphase clock generator is shown in FIG. 3 where it bears numeral 11. Referring to FIG. 3, the reference clock signal clk and the loop signal that is internally generated by the PLL circuit 11 are applied to the phase comparator 21, which in turn generates a signal that is supplied to a charge pump 22. The latter outputs a controlled signal that is fed to a voltage controlled oscillator (VCO) circuit 24 via a loop filter 23. The VCO circuit 24 is coupled to a frequency divider 25 that supplies the loop signal on line 26. The desired number n of oversampling clock phases, sixteen in the instant case, obtained either on the rising edge or the falling edge of the reference clock, are referenced $C_1$ to $C_{16}$.

2. Description of the Oversampling Circuit 12

Figure 4:
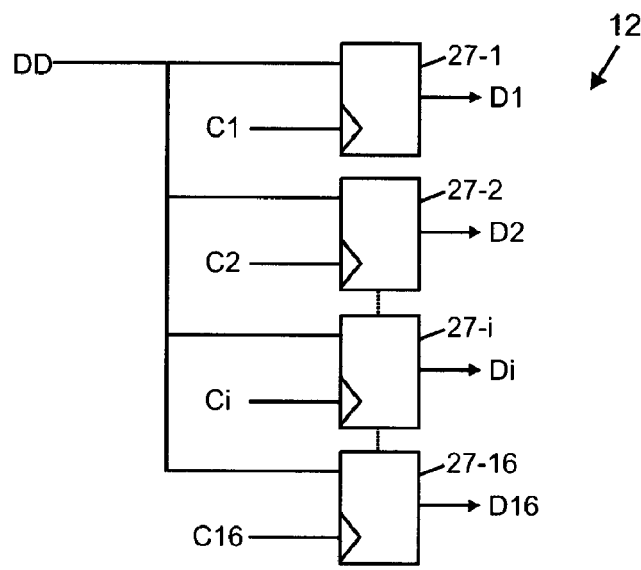
FIG. 4 is the circuit diagram of the oversampling circuit of FIG. 2.

The oversampling circuit 12 collects either one bit (SDR) or two consecutive bits (DDR) in sixteen samples. The sampling is done on each phase $C_1$ to $C_{16}$. An example of a simple implementation of oversampling circuit 12 is shown in FIG. 4. Referring to FIG. 4, oversampling circuit 12 includes 16 flip-flops 27-1 to 27-16 that are respectively controlled by the sixteen phases $C_1$ to $C_{16}$. $D_1$ to $D_{16}$ represent the 16 data samples available at the output of their respective flip-flop.

3. Description of the Edge Detection Circuit 13

Figure 5:
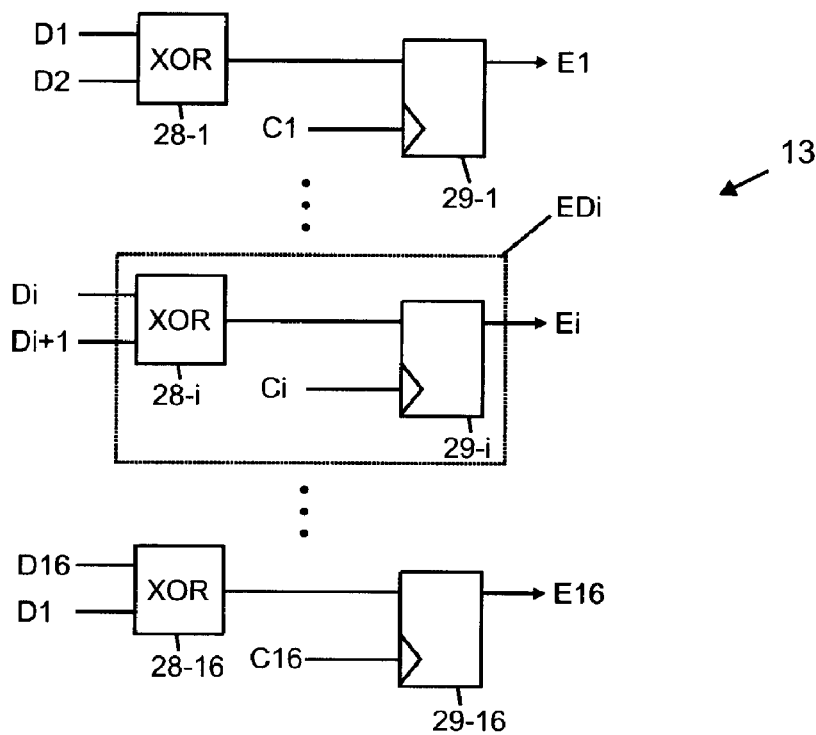
FIG. 5 is the circuit diagram of the data edge detection circuit of FIG. 2.

The data edge detection circuit 13 is directly connected at the oversampling circuit 12 output and is responsible to detect a value change between two consecutive data samples. Referring to FIG. 5, the edge detection circuit 13 is made of 16 edge detection elements, each one corresponding to a data sample. Edge detection element EDi comprises a XOR gate 28-i that compares the two consecutive data samples Di and Di+1. The comparison result Ei, i.e., the edge information, is stored in a flip-flop 29-i clocked by the same clock phase Ci as the first of the two samples to be compared.

There are as many edge detection elements as there are data samples. When a data transition is detected between two consecutive data samples, the edge detection element output switches to the '1' level during a single clock period. To allow the data sample selection circuit 20 to select the best data sample to recover, the edge information is collected during an extended period of time so that the data jitter with regards to oversampling clock phases is taken into account.

4. Description of the Data Edge Memory 14

Figure 6:
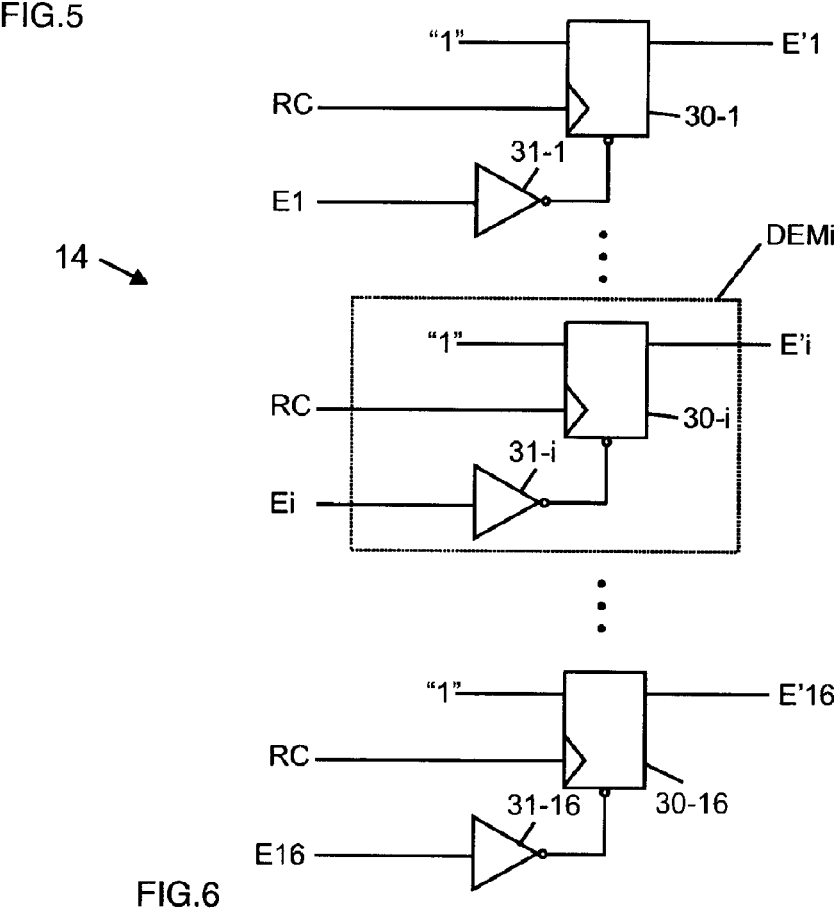
FIG. 6 is the circuit diagram of the data edge memory of FIG. 2.

The data edge memory 14 is directly connected at the edge detection circuit 13 output. Referring to FIG. 6, the data edge memory 14 is made of 16 data edge memory elements, each one corresponding to a data sample. Thus, there are as many data edge memory elements as there are edge detection elements. The data edge memory 14 is a first feature of the present invention. Data edge memory element DEMi consists of an asynchronous reset flip-flop (or a similar register element) 30-$i$ which has its data input permanently set to '1' and its clock input connected to a reset signal RC. The RC clock signal generated by the control logic circuit 19, is a pulse used to reset periodically every data edge memory elements at the '1' value.

In a preferred embodiment the RC signal period or edge sampling period is tuned in a configuration register (not shown). The edge information signal Ei is applied to the asynchronous input via an inverter 31-$i$. In this preferred embodiment any edge information signal Ei at the '1' level, i.e., indicating the presence of a data edge, sets a '0' level in the corresponding flip-flop 30-$i$. The signal latched in flip-flop 30-$i$, labeled E'i, at this '0' level, is kept for an extended length of time such as several tenths or hundreds of clock periods.

One advantage of using an asynchronous reset flip-flop is that it allows collection of data edge events during such an extended period of time in a simple manner. However other embodiments could be envisioned as well. Another advantage is that it collects the edge information independently of their related oversampling clock phase. As a significant result, all signals derived therefrom could be exploited with a determined oversampling clock phase, e.g., $C_1$. In this preferred embodiment, sixteen phases of a reference clock are used to collect sixteen data samples during each clock period. The following examples illustrate the values of the $E'_1$ to $E'_{16}$ signals for different cases.

Example 1 represents E' values for single data rate (SDR) data without jitter. The position of the single '0' corresponds to the sample position where a data transition was detected.

EXAMPLE 1

1111101111111111

Example 2 represents E' values for single data rate (SDR) data with jitter. The transition position varies in time due to the presence of jitter, so that more than one data transitions are detected.

EXAMPLE 2

1110001111111111

Figure 1:
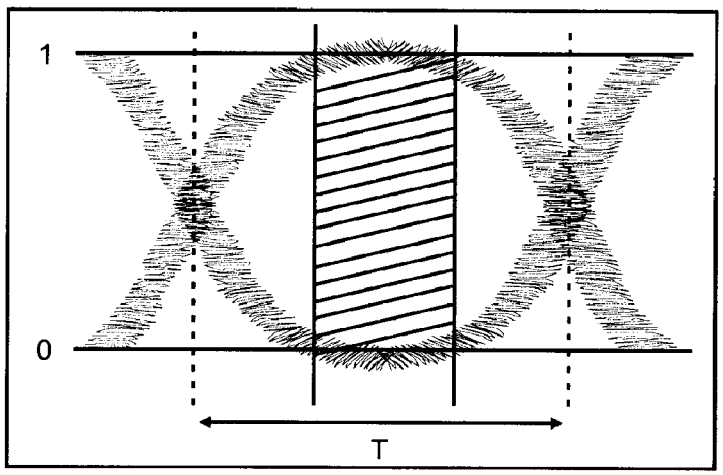
FIG. 1 shows a typical eye diagram for a high speed serial data link wherein some jitter can be noticed.

The zone filled with '0's corresponds to the grayed zone in the eye diagram of FIG. 1.

Example 3 represents E' values for double data rate (DDR) data without jitter. As there are now two bits of data per clock period, two data transition positions were detected.

EXAMPLE 3

1111101111111011

Example 4 represents E' values for DDR data with jitter. The presence of jitter on the incoming data stream has the effect of moving the detected data edge randomly around a central position. The effect on the E' values is to increase the width of the zones with adjacent '0's.

EXAMPLE 4

1111000111110001

Therefore, the edge information is presented under the form of a bit map. A bit set to '0' indicates that a data edge has been detected at this corresponding sample position during the duration of a previous edge search and a bit set to '1' indicates a sample position where no data edge was seen during the same duration. Assuming a reasonable level of jitter and further assuming the edge information is collected for a long duration compared to the data bit period, then the bit map appears as one zone (SDR) or two zones (DDR) filled with adjacent '0's (corresponding to the zone where data edges were detected) surrounded by adjacent '1's. The last bit map position is considered as adjacent to the first bit map position and conversely. Therefore, in the case of DDR data, the bit map contains two zones filled with '0's separated by zones filled with '1's and in the case of SDR data, the bit map contains one zone filled with '0's surrounded by a zone filled with '1's.

5. Description of the Maverick Edge Detection/Suppression Circuit 15

Now, according to the present invention, the data edge information stored in the edge memory 14 is filtered in the Maverick data edge detection/suppression circuit 15 which basically consists of a validation circuit and filters. Maverick edge detection/suppression circuit has the key role of detecting and suppressing maverick edges, i.e., edges which are not adjacent to any other edge in the edge memory 14. During this detection, the first position of the data edge memory is considered to be adjacent to the last position of the edge memory. The maverick edge suppression algorithm is summarized in the three following rules:

1. Validation: No edges are suppressed if two adjacent edges cannot be found in the data edge memory 14.

2. Hole Filler: If two adjacent edges cannot be found in the data edge memory 14, any single no-edge information located between two edges in the edge memory is replaced by an edge.

3. Maverick edge: If two adjacent edges are found in the data edge memory 14, any single edge located between two non-edge is suppressed.

The first rule defines the field of application for the algorithm and ensures that no data edge suppression would occur in a situation where maverick edges cannot be identified. The second rule is to handle special cases when it cannot be determined whether a given edge is more representative than another one. The third rule deals with maverick edge filtering. Examples of data edge filtering are shown on the table below in 8-bit edge bitmap where a '0' denotes a data edge.

|  | input data edges | filtered data edges |
|---|---|---|
| example 1 | 1 1 1 0 1 1 1 1 | 1 1 1 0 1 1 1 1 |
| example 2 | 1 1 1 0 1 0 1 1 | 1 1 1 0 0 0 1 1 |
| example 3 | 1 0 0 0 1 0 1 1 | 1 0 0 0 1 1 1 1 |

Figure 7:
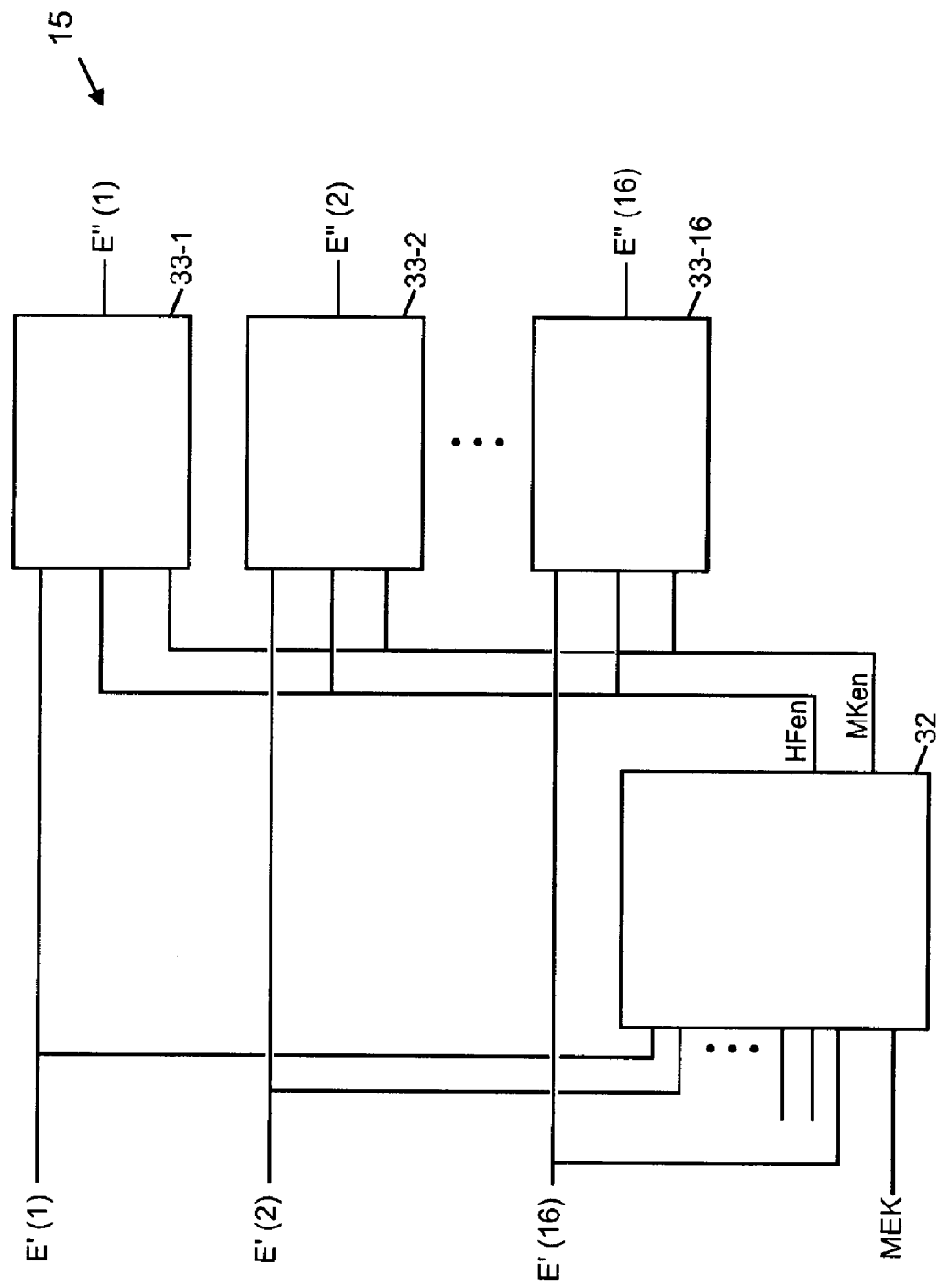
FIG. 7 is the circuit diagram of the maverick data edge detection/suppression circuit of FIG. 2.
Figure 8:
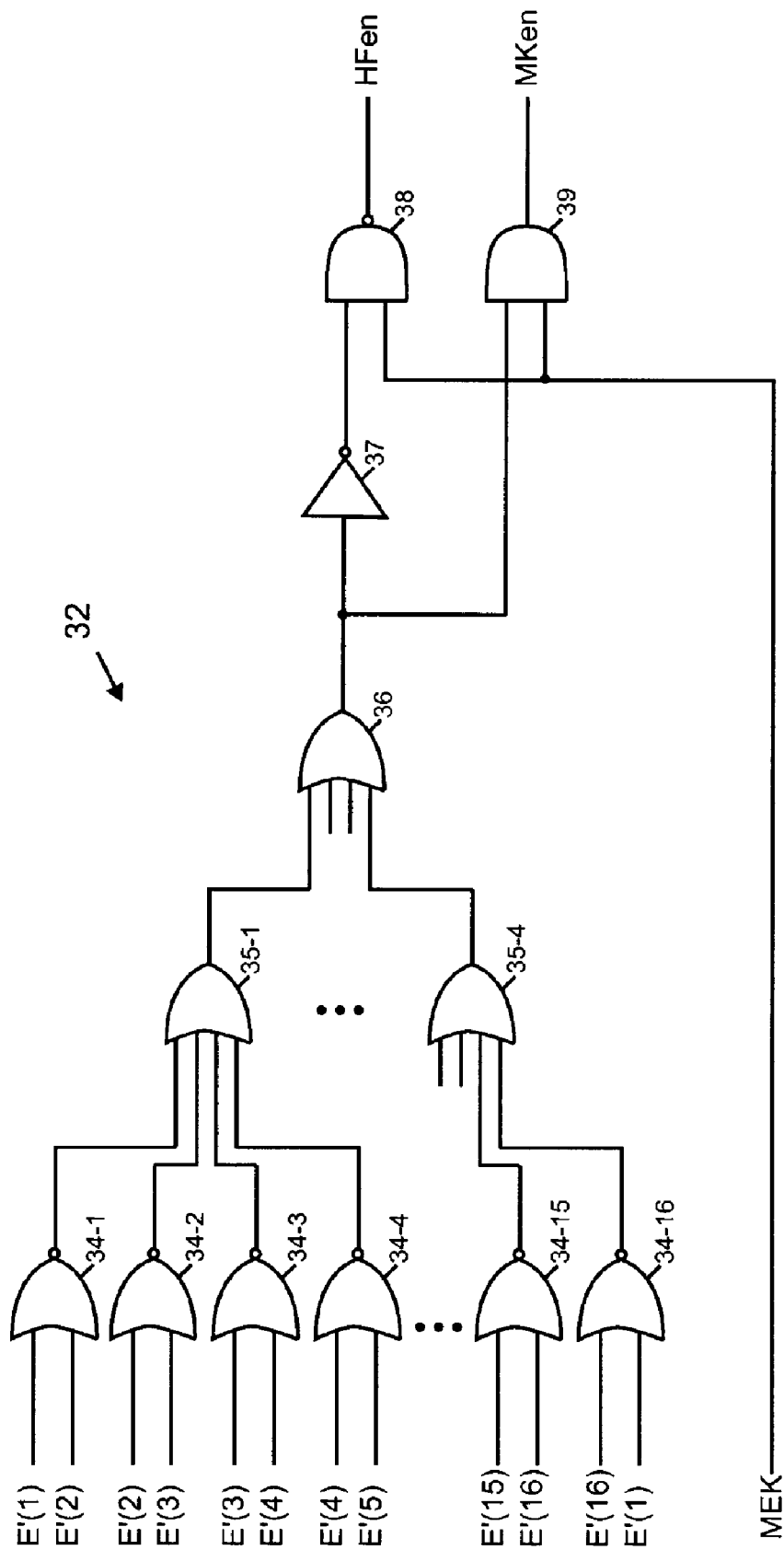
FIG. 8 shows a typical implementation of the validation circuit of FIG. 7.
Figure 9:
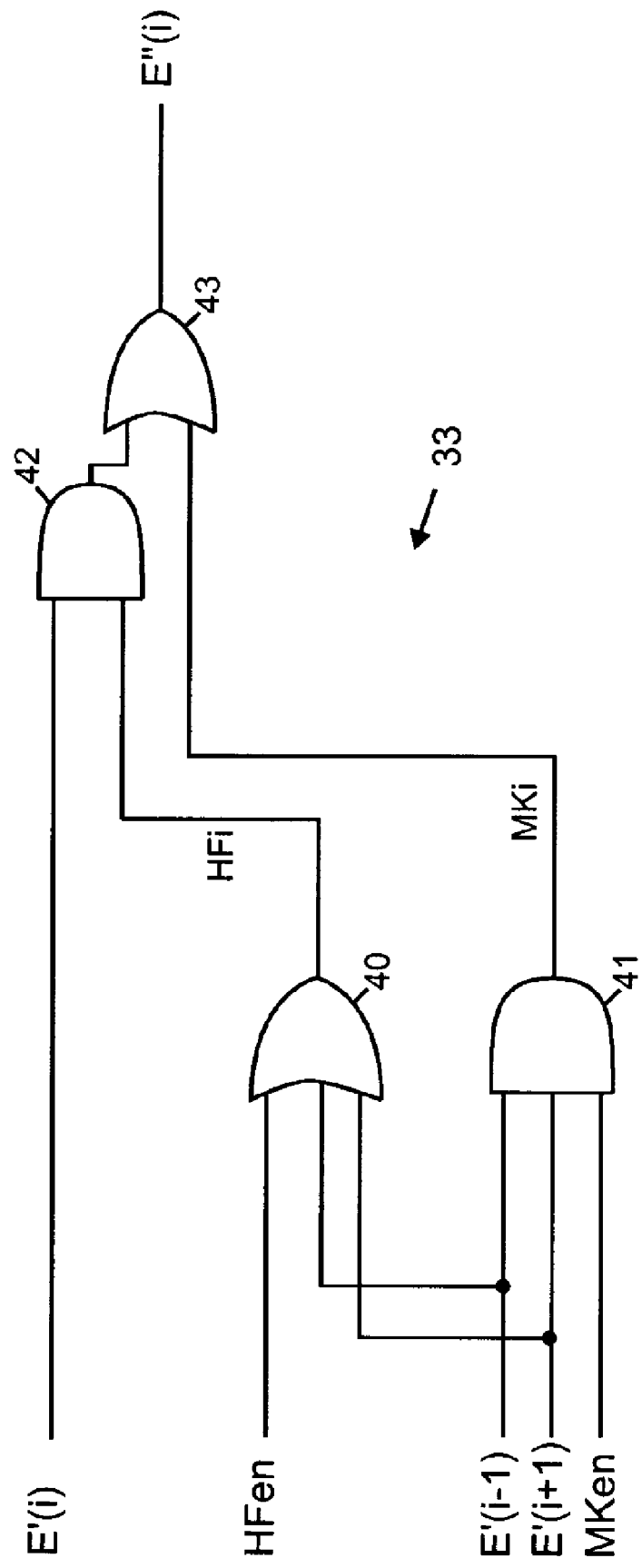
FIG. 9 shows a typical implementation of one of the filters of FIG. 7.

A detailed description of the maverick edge detection/suppression circuit 15 will be best understood with reference to FIGS. 7-9.

FIG. 7 is a simplified block diagram of a preferred embodiment of the maverick edge detection/suppression circuit 15. The memorized data edges signals E'1 to E'16 are applied to a validation circuit 32 that is responsible to deliver two enable signals MKen and HFen. The validation circuit 32 also receives the MEK signals that turns on or off the filtering feature. The sixteen memorized E' signals are also applied to sixteen identical filtering circuits 33-1 to 33-16. The MKen signal enables the edge suppression feature of the filter. The HFen signals enable the addition of an edge between two edges when no adjacent edges can be found.

FIG. 8 shows a typical implementation of the validation circuit 32. A battery of NOR gates 34-1 to 34-16 allows for detecting adjacent edges. The five OR gates 35-1 to 35-4 and 36 are then used to deliver a signal at high level if adjacent edges are detected. The MEK signal is an enable signal that is used to switch off or on the Maverick edge suppression circuit. When the MEK signal is at the high level, the signal delivered by OR gate 36 is transmitted by AND gate 39 to produce the MKen enable signal. The signal delivered by OR gate 36 also controls the HFen enable signal through inverter 37 and NAND gate 38. The MKen signal is used to enable the Maverick Edge Killer and takes a high level when adjacent edges are detected and MEK is at high level. The Hfen signal is used to enble the Hole Filler feature and is active at low level, i.e., when no adjacent edge is detected and MEK is at high level.

FIG. 9 shows a typical implementation of one of the sixteen identical filters 33-1 to 33-16 that is generically labeled 33. A OR gate 40 receives signal E'(i−1) on a first input, signal E'(i+1) on a second input, and signal HFen on the third input. The signal that is output from OR gate 40, labeled HFi, is applied to a first input of a AND gate 42. The second input of AND gate 42 is signal E'(i). A AND gate 41 receives signal E'(i−1) on a first input, signal E'(i+1) on a second input, and signal MKen on the third input. The signal that is output from AND gate 41, labeled MKi, is applied to a first input of a OR gate 43 and the signal that is output from AND gate 42 is applied to the second input of OR gate 43. The signal that is output from OR gate 43, labeled E"(i), represents the filtered data edges.

When MKen and HFen are at their inactive level (i.e., low level for MKen and high level for HFen), the filter is not active and the output E"i takes the value of the input signal E'i. When active, the circuit of FIG. 9 obeys the three rules of the maverick edge killer algorithm:

1. Validation: when no adjacent data edges are detected, signal MKen remains at low level so any '0' corresponding to a data edge on E'i will result in a '0' on E'i.
2. Hole Filler: when no adjacent data edge is detected, HFen signal is at low level and a '0' will therefore appear at the output of OR gate 40 only when both E'i−1 and E'i+1 are set at '0'. Then the '0' on HFi is applied to AND gate 42 so that the E"i will be forced to a '0' value. In such case MKen is at low level and does not play any role.
3. Maverick edge: If adjacent data edges are detected, HFen and HFi are at high level and AND gate 42 does not play any role. If there is no edges on both E'i−1 and E'i+1, they are both at '1' and MKi is at '1' therefore driving E"i at '1' by means of OR gate 43 whatever the value of E'i. Quid de 109.

6. Description of the Selection Determination Circuit 16

The selection determination circuit 16 is directly connected at the maverick data edge detection/suppression circuit 15 output and has the role of determining which data sample(s) is (are) to be kept. It uses the memorized edge information to indicate which sample is the farthest from the data edges. At the input of this circuit, the edge information is thus presented under the form of a bit map with as many bits as there are samples. The selection determination circuit locates the edges of the zone(s) filled with '1's and progressively reduces the width of the zone until it only contains only one '1's.

As this width reduction is performed alternatively on each side the remaining '0' points to the center of the zone where no data edge was located, i.e., it points to the data sample which is the farthest from the data edge position. To recover the data when the incoming data stream is jittered, it is important to select the sample (in case of SDR data) or the samples (for DDR data) located the farthest from any possible position of a data edge. Looking now at the E" values shown in the above examples, selecting the best sample corresponds to localizing the middle of the zone filled with '1's. This is done with the repetition of the two-step algorithm described below.

In a first step, the particular pattern 110 is searched in the suite of the E" values to locate the right side of a zone filled with '1's. In the search for this right pattern (RP), the right most value of the suite of the E" values ($E''_{16}$ in this preferred embodiment) is considered to be adjacent with the leftmost value of the suite of E" value (i.e., $E''_1$). Each time the 110 RP pattern is found, it is replaced by the 100 value, so that it effectively decreases the width of the zone filled with '1's by one unit and by the right side of the zone.

The second step of the algorithm searches for the 011 pattern which is characteristic of the left side of a zone filled with '1's in the suite of E" values. Similarly, in the search for this left pattern (LP), the leftmost value of the suite of the E" values ($E''1$ in the preferred embodiment) is considered to be adjacent with the rightmost value of the suite of E" values (i.e., $E''_{16}$). Each time the 011 LP pattern is found, it is replaced by the 001 value so that it effectively decreases the width of the zone filled with '1's by one unit and by the left side of the zone. This algorithm is repeated by successive iterations until the width of the zone filled with '1's is reduced to a single position, in other words it just remains one '1' (approximately, the central one in the zone).

When recovering SDR data, only one '1' value is found and this single value correspond to the position of the best sample to be kept as the recovered data. When recovering DDR data, two different '1's are kept corresponding to the positions of the best samples to be kept as the data to recover in the incoming data stream.

Figure 10:
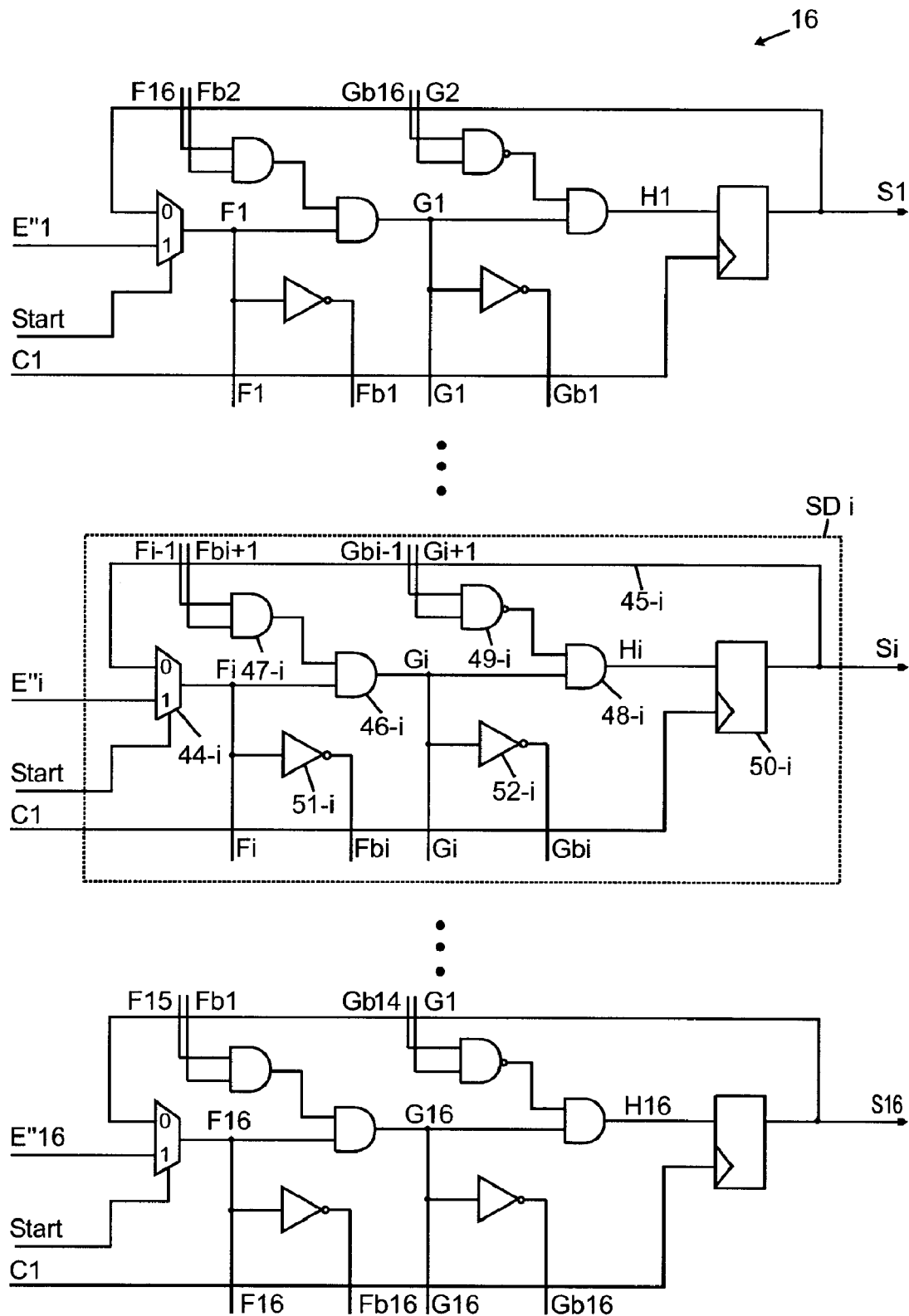
FIG. 10 is the circuit diagram of the selection determination circuit of FIG. 2.

FIG. 10 shows a preferred hardware embodiment of the above described algorithm that functionally performs these operations. The selection determination circuit 16 is made of sixteen selection determination elements SDi (i=1 to 16), each one corresponding to a data sample. Thus, there are as many selection determination elements as there are data edge memory elements.

Considering Example 2 for the sake of simplicity, applying the above two-step algorithm to process the initial bit map, will result in the following bit sequences:
1111000111111111
1110000111111111 (1st step RP, 1st iteration)
1110000011111111 (2sd step LP, 1st iteration)
1100000011111111 (1st step RP, 2sd iteration)
1100000001111111 (2sd step LP, 2sd iteration)
and so on, until the following sequence is obtained:
0000000000000100 (2sd step LP, 6th iteration)
indicating thereby that the fourteenth data sample is the best one. Still referring to FIG. 10, let us consider selection determination element SDi. A two-way selector 44-i receives signal E"i (output by data edge memory element DEMi) on a first input and the signal, referred to as the selection signal Si, generated by the whole element SDi via loop 45-i on a second input. Selector 44-$i$ is controlled by signal labeled Start generated by the control logic block 19. The signal that is output from selector 44-$i$, labeled Fi, is applied to a first input of two-way AND gate 46-$i$, the other input of which receives the ANDing result between signals Fi−1 and Fbi+1 (NOT Fi+1) through two-way NAND gate 47-$i$. AND gates 46-$i$ and 47-$i$ thus implement the first step of the above described two-step algorithm.

In turn, the signal Gi that is output from AND gate 46-$i$ is applied to a first input of two-way AND gate 48-$i$, the other input of which receives the result of ANDing signals Gbi−1 (NOT Gi−1) and Gi+1 through two-way NAND gate 49-$i$ to generate signal Hi. AND gates 48-$i$ and 49-$i$ thus implement the second step of the above described two-step algorithm. Finally, signal Hi is applied to the data input of flip-flop 50-$i$ to latch selection signal Si. The clock input of flip-flop 50-$i$ receives clock phase $C_1$. As shown in FIG. 10, two INVERTER gates 51-$i$ and 52-$i$ respectively generates signals Fbi (NOT Fi) and Gbi (NOT Gi) from signals Fi and Gi.

As mentioned above, flip-flop 30-$i$ (see FIG. 6) collects the edge information using its asynchronous reset input. At the end of the edge information sampling time, the selection signal Start of selector 44-$i$ (delivered by the control logic circuit 19) switches to the '1' level during one clock period and then returns to '0'. When it returns to '0', flip-flop 30-$i$ can be synchronously set to '1' by having its clock input switching to '1' then back to '0'. The signal at the output of the selector 44-$i$ is combined using NAND, AND and INVERTER gates to execute the two steps of the above described algorithm.

The F signal of the previous SD element (SDi−1), i.e., Fi−1, is combined in a NAND gate with the inverted F value of the next SD element (SDi+1), i.e., Fbi+1. The resulting signal is then ANDed with the Fi signal to form the Gi signal, thus effectively detecting the occurrence of the 110 pattern and forcing the middle '1' to a '0' when the pattern is found. Similarly, the Gi signal is combined with the G signal from adjacent SD element to detect the 011 pattern and replace the middle value thereof by a '0' when this pattern is found.

The Hi signal is captured in flip-flop 50-$i$ at each clock phase $C_1$, rising edge to generate selection signal Si. By allowing the Hi signal to re-circulate through the selector 44-$i$ via loop 45-$i$, one can see that the width of the zone initially filled with '1's at the flip-flop 50-$i$ output of SDi element, will decrease until there is only one '1'. Extra iterations will be without any effect. The maximum number of iterations to be performed is equal to the fourth of the number of data samples in the case of DDR data (i.e., four iterations in the preferred implementation using sixteen samples per clock period) or one half of the number of data samples in the case of SDR data (i.e., eight iterations in the case of the preferred implementation). There is no penalty in having the data selection having to loop four or eight clock cycles as it is expected that the collection of data edges will last more time to ensure the data sample selection circuit 20 will take into account the data jitter.

FIG. 10 illustrates the assembly of 16 SD elements to build the totality of the selection determination circuit 16. The selection signals S(1:16) cannot be directly used to select the best data sample(s) to be kept as their values is subject to change between the different iterations. However, given the condition that the data edge collection delay in data edge memory 14 is always greater than the iteration delay in selection determination circuit 17, the selection signals S(1:16) values are stored in a memory at the same time or just before new data edges are processed.

7. Description of the Selection Validation Circuit 17

Figure 11:
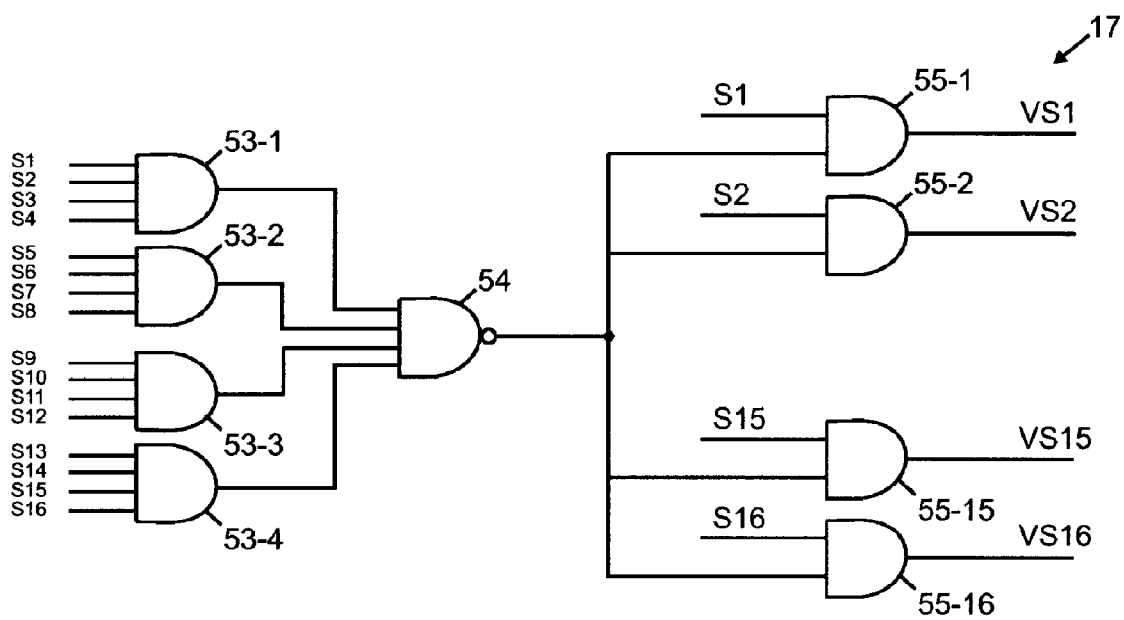
FIG. 11 is the circuit diagram of the selection validation circuit of FIG. 2.

FIG. 11 shows a preferred embodiment of the selection validation circuit 17 of FIG. 2 which has the role of validating the selection. Referring to FIG. 11, a group of four, four-way AND gates referenced 53-1 to 53-4 processes the selection signals $S_1$ to $S_{16}$, four per four. The outputs of these four AND gates are connected to the respective inputs of four-way NAND gate 54. In turn, the signal that is output from NAND gate 54 is applied to a first input of a battery of 16 two-way AND gates referenced 55-1 to 55-16. The respective selection signal is applied on the second input of each of these two-way AND gates, for instance selection signal $S_1$ is applied to AND gate 55-1 to generate signal $VS_1$ and so on.

If there is no data edge during the period between two RC (reset clock) signals, the selection determination circuit 16 will incorrectly indicate that each data sample is to be recovered by setting each selection signal S(1:16) to the '1' level. To avoid data recovery errors, the selection validation circuit 17 disables all selection signals when they are all at the '1' level. As shown in FIG. 11, selection signals $S_1$ to $S_{16}$ are ANDed in two steps, first in AND gates 53-1 to 53-4, then in NAND gate 54 for technology reasons. As a result, NAND gate 54 output is at '1', if at least one selection signal is at '0' and at '0' otherwise. This output is then used as the validation signal for the selection signals $S_1$ to $S_{16}$. Therefore, $VS_1$ to $VS_{16}$ designate the selection signals that have been validated.

It is noted that the determination of the best selection signals and their validation performed in circuits 16 and 17 only imply the use of only combinatorial logic instead of complex computation means such as a microprocessor.

8. Description of the Selection Memory 18

Figure 12:
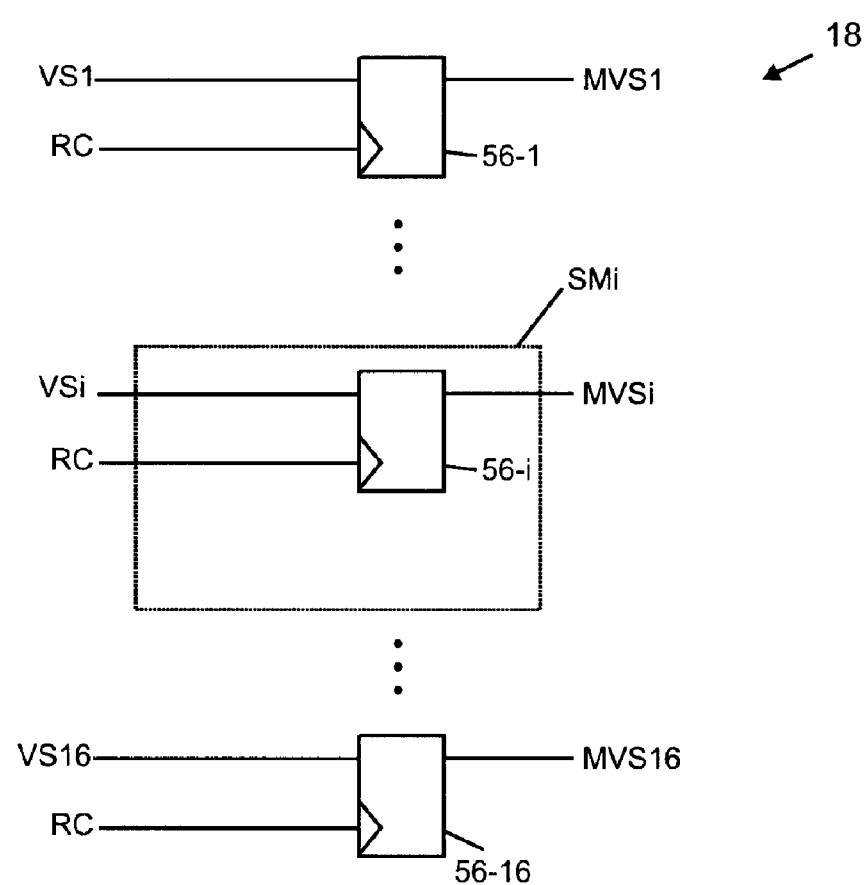
FIG. 12 is the circuit diagram of the selection memory of FIG. 2.

At this point, it is important to memorize the validated values of the selection signals, i.e., $VS_1$ to $VS_{16}$, so that these values can be used while new data edges are processed and new selection signals are updated. Selection memory 18 can have a similar construction to the data edge memory 14. Referring to FIG. 12, there is shown validation memory element SMi, which simply consists of asynchronous reset flip-flop 56-$i$. The validated signal VSi is applied to its asynchronous input and its clock input connected to the reset signal RC. The signal latched in flip-flop 56-$i$, labeled MVSi, is kept for an extended length of time such as several tenths or hundreds of the reference clock period. The memorized validated selection signals in flip-flops 56-1 to 56-16 are labeled MVS1 to MVS16 respectively.

9. Description of the Data Sample Selection Circuit 20

Figure 13:
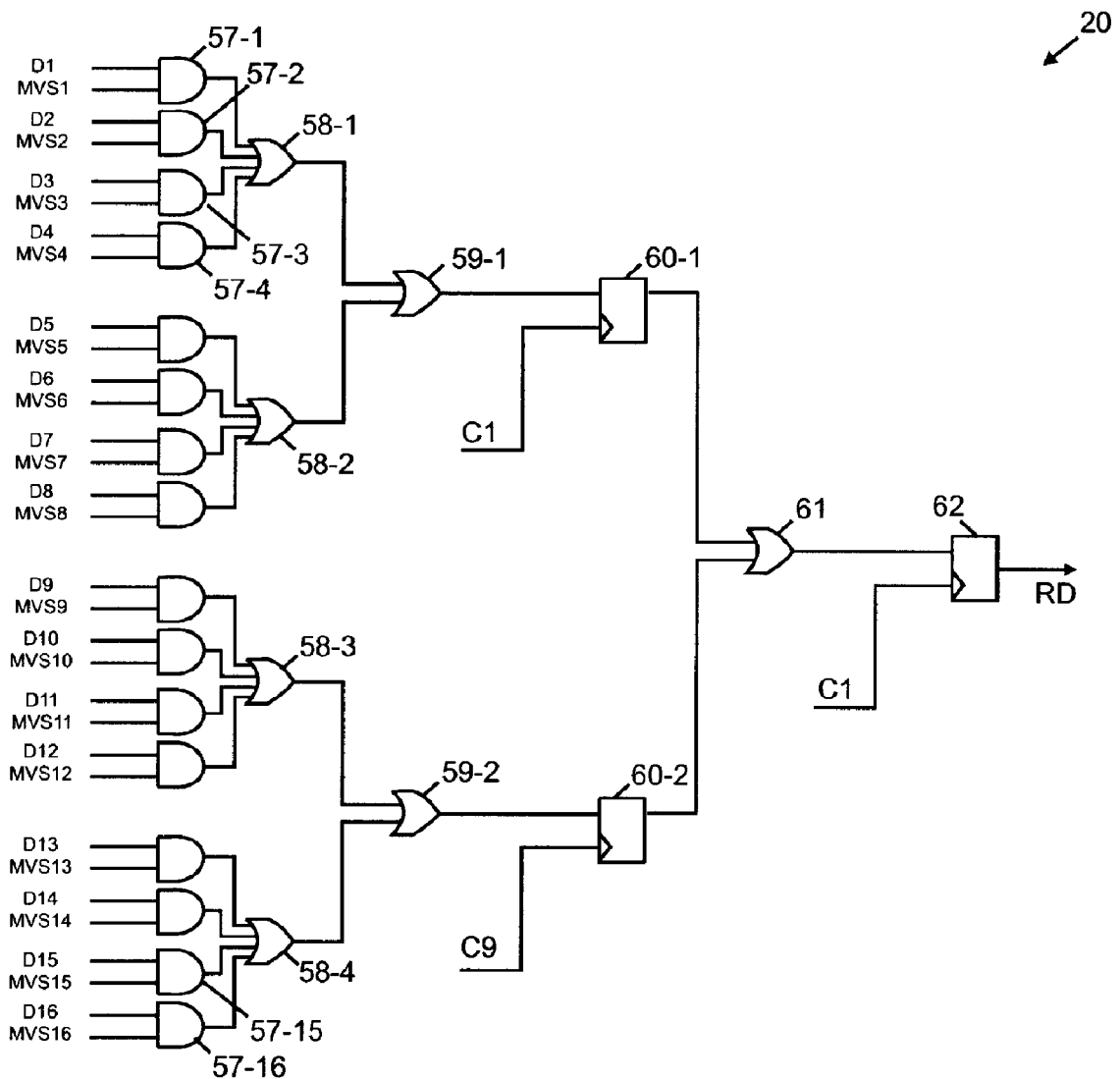
FIG. 13 is the circuit diagram of the data sample selection circuit of FIG. 2.

The data sample selection circuit 20 is depicted in FIG. 13. It first includes four groups of four, two-way AND gates referenced 57-1 to 57-16, each AND gate, receives the corresponding data sample D and memorized validated selection signal MVS. For instance, AND gate 57-1 receives data sample D1 and signal MVS1. In each group, the output of the four AND gates is connected to one input of a four-way OR gate. As shown in FIG. 13, these OR gates are referenced 58-1 to 58-4. The outputs of OR gates 58-1 and 58-2 are connected to an input of a two-way OR gate 59-1.

Similarly, the outputs of OR gates 58-3 and 58-4 are connected to an input of a two-way OR gate 59-2. The output of OR gate 59-1 is connected to the data input of flip-flop 60-1 whose clock input receives clock phase $C_1$. Similarly, the output of OR gate 59-2 is connected to the data input of flip-flop 60-2 whose clock input receives clock phase $C_9$ (in phase opposition with clock phase $C_1$). Signals latched in flip-flops 60-1 and 60-2 are applied to two-way OR gate 61, the output of which is connected to the data input of flip-flop 62. Its clock input is driven by clock phase $C_1$. The signal latched in flip-flop 62 is the recovered data RD.

The data selection circuit 20 shown in FIG. 13 illustrates how the memorized selection signals $MVS_1$ to $MVS_{16}$ are exploited to recover the data. The best data sample is selected using AND gates (or AND-OR gates). The different combinations are then further combined using OR gates. If the data to recover is coming from the $D_1$ to $D_8$ range, it can be safely captured by the $C_1$ clock phase. Alternatively, if it comes from the $D_9$ to $D_{16}$ range, it is captured by the $C_9$ clock phase. The OR gate 61 then combines the data coming from flip-flops 60-1 and 60-2 and the recovered data RD is captured by the $C_1$ clock phase.

In the case of DDR data, two circuits 20'/20" identical to the data sample selection circuit 20 of FIG. 13 would then be necessary. An additional requirement would be that each circuit uses two different set of memorized validated selection signals MVS(1:16), each one pointing a different data sample to recover. Such a circuit able to split the present set of the validated selection signals VS(1:16) in two sets is not shown but could be easily designed by an ordinary skilled professional.

While the invention has been particularly described with respect to the preferred embodiments thereof it should be understood by one skilled in the art that the foregoing and other changes in form and details may be made therein without departing from the spirit and scope of the invention.

What is claimed is:

1. An improved data recovery circuit for recovering the data sample in a set of data samples obtained by oversampling the data to recover in an incoming stream of data bits in which the maverick data edge are detected and suppressed comprising:

a data input for receiving said incoming stream of data bits serially transmitted on a high speed communication link with jitter and skew at a specified data rate synchronous with a reference clock;

oversampling means coupled to said data input to sample the data bits to recover by the n phases ($C_1, \ldots, C_n$) of said reference clock signal generated by a multiphase clock signal generator to produce a set of data samples $D_1, \ldots, D_n$) during each reference clock period;

edge detection means coupled to said oversampling means and configured to compare at least two consecutive data samples and to generate a corresponding set of signals ($E_1, \ldots, E_n$) representing the data edge information indicative of the data edge or transition positions, so that when a data edge is detected between said at least two consecutive data samples, the data edge information signal is at a determined binary logic level and at the opposite binary logic level otherwise;

first memory means coupled to said edge detection means and configured to collect the data edge information in a corresponding set of signals ($E'_1, \ldots, E'_n$) presented in the form of a map of n bits for an extended period of time, the data edge information signal is at a first binary logic level for detected data edges and at a second binary logic level otherwise, wherein the last bit map position is considered as adjacent to the first bit map position, and conversely;

maverick edge detection/suppression means coupled to said first memory means;

selection determination means coupled to said maverick edge detection/suppression means and configured to use the memorized data edge information signals to generate selection signals ($S_1, \ldots, S_n$) by locating a zone filled with binary values representative of said second binary logic level in said bit map and reducing its width by performing successive iterations alternatively on the two sides of the zone until it only contains one value at said second binary logic level, which points to the center of the zone where no data edge was detected, thereby selecting the corresponding data sample which is the farthest of the data edge positions;

selection validation means coupled to said selection determination means to validate said selection signals and generating validated selection signals ($VS_1, \ldots, VS_n$) to avoid false determination due to jitter/skew;

second memory means coupled to said selection validation means to memorize the validated values of said selection signals in a corresponding set of signals ($MVS_1, \ldots, MVS_n$); and, data sample selection means coupled to said oversampling means to receive the data samples ($D_1, \ldots, D_n$) and to said second memory means to receive said memorized values of validated selection signals ($MVS_1, \ldots, MVS_n$) to generate the recovered data (RD).

2. The improved data recovery circuit of claim 1 wherein said maverick edge detection/suppression means comprise filtering validation means and edge filtering means, the filtering validation means controlling the features of the edge filtering means.

3. The improved data recovery circuit of claim 2 wherein the edge filtering means are adapted to replace any single no-edge information located between two edges in the first memory means by an edge if two adjacent edges cannot be found in the first memory means, and to suppress any single edge located between two non-edge in the first memory means if two adjacent edges are found in the first memory means.

4. The improved data recovery circuit of claim 3 wherein the filtering validation means disable the edge filtering means when two adjacent edges can not be found in the first memory means, so that no edges are suppressed in the first memory means.

5. The improved data recovery circuit of claim 4 wherein the selection validation means is adapted to disable all selection signals of the selection determination means when no data edge is detected during the extended period of time of the first memory means.

6. The improved data recovery circuit of claim 1 wherein the multiphase clock signal generator uses a phase locked loop oscillator to generate n=16 multiple phases of the reference clock.

7. The improved data recovery circuit of claim 1 wherein the first memory means, the second memory means, or both of the first and second memory means uses asynchronous reset flip-flop.

8. The improved data recovery circuit of claim 1 wherein said oversampling means are adapted to collect two consecutive bits in n phases, the selection determination means being configured to use the memorized data edge information signals to generate selection signals ($S_1, \ldots, S_n$) by locating the two zones filled with binary values representative of said second binary logic level in said bit map and reducing their widths by performing successive iterations alternatively on the two sides of the zones until they only contain two values at said second binary logic level, which point to the center of the zones where no data edge was detected, allowing thereby to select the corresponding data samples which are the farthest of the data edge positions.

9. The improved data recovery circuit of claim 2 wherein the multiphase clock signal generator uses a phase locked loop oscillator to generate n=16 multiple phases of the reference clock.

10. The improved data recovery circuit of claim 2 wherein the first memory means, the second memory means, or both of the first and second memory means uses asynchronous reset flip-flop.

11. The improved data recovery circuit of claim 2 wherein said oversampling means are adapted to collect two consecutive bits in n phases, the selection determination means being configured to use the memorized data edge information signals to generate selection signals ($S_1, \ldots, S_n$) by locating the two zones filled with binary values representative of said second binary logic level in said bit map and reducing their widths by performing successive iterations alternatively on the two sides of the zones until they only contain two values at said second binary logic level, which point to the center of the zones where no data edge was detected, allowing thereby to select the corresponding data samples which are the farthest of the data edge positions.

12. The improved data recovery circuit of claim 3 wherein the multiphase clock signal generator uses a phase locked loop oscillator to generate n=16 multiple phases of the reference clock.

13. The improved data recovery circuit of claim 3 wherein the first memory means, the second memory means, or both of the first and second memory means uses asynchronous reset flip-flop.

14. The improved data recovery circuit of claim 3 wherein said oversampling means are adapted to collect two consecutive bits in n phases, the selection determination means being configured to use the memorized data edge information signals to generate selection signals ($S_1, \ldots, S_n$) by locating the two zones filled with binary values representative of said second binary logic level in said bit map and reducing their widths by performing successive iterations alternatively on the two sides of the zones until they only contain two values at said second binary logic level, which point to the center of the zones where no data edge was detected, allowing thereby to select the corresponding data samples which are the farthest of the data edge positions.

15. The improved data recovery circuit of claim 4 wherein the multiphase clock signal generator uses a phase locked loop oscillator to generate n=16 multiple phases of the reference clock.

16. The improved data recovery circuit of claim 4 wherein the first memory means, the second memory means, or both of the first and second memory means uses asynchronous reset flip-flop.

17. The improved data recovery circuit of claim 4 wherein said oversampling means are adapted to collect two consecutive bits in n phases, the selection determination means being configured to use the memorized data edge information signals to generate selection signals ($S_1, \ldots, S_n$) by locating the two zones filled with binary values representative of said second binary logic level in said bit map and reducing their widths by performing successive iterations alternatively on the two sides of the zones until they only contain two values at said second binary logic level, which point to the center of the zones where no data edge was detected, allowing thereby to select the corresponding data samples which are the farthest of the data edge positions.

18. The improved data recovery circuit of claim 5 wherein the multiphase clock signal generator uses a phase locked loop oscillator to generate n=16 multiple phases of the reference clock.

19. The improved data recovery circuit of claim 5 wherein the first memory means, the second memory means, or both of the first and second memory means uses asynchronous reset flip-flop.

20. The improved data recovery circuit of claim 5 wherein said oversampling means are adapted to collect two consecutive bits in n phases, the selection determination means being configured to use the memorized data edge information signals to generate selection signals ($S_1, \ldots, S_n$) by locating the two zones filled with binary values representative of said second binary logic level in said bit map and reducing their widths by performing successive iterations alternatively on the two sides of the zones until they only contain two values at said second binary logic level, which point to the center of the zones where no data edge was detected, allowing thereby to select the corresponding data samples which are the farthest of the data edge positions.

* * * * *